United States Patent Office 2,770,622
Patented Nov. 13, 1956

2,770,622

PROCESS FOR THE PRODUCTION OF 2,4-DIAMINO-6-CHLORO-S-TRIAZINE

Bert S. Gorton and Byron L. Williams, Texas City, Tex., assignors to Monsanto Chemical Company, St. Louis, Mo., a corporation of Delaware No Drawing. Application December 30, 1954, Serial No. 478,876

5 Claims. (Cl. 260—249.8)

This invention relates to 2,4-diamino-6-chloro-s-triazine and more particularly to an improved process for its production.

2,4-diamino-6-chloro-s-triazine is an intermediate used in the preparation of monophenylmelamine. Heretofore, 2,4-diamino-6-chloro-s-triazine has been prepared by the reaction of cyanuric chloride and ammonia in organic solvents or in aqueous organic solvents. The reaction in a totally aqueous medium has been reported in the literature but physical handling and yields have not been too satisfactory.

It is an object of this invention to provide an improved process for the preparation of 2,4-diamino-6-chloro-s-triazine by the reaction of ammonia and cyanuric chloride in a totally aqueous medium.

Further objects will become apparent from the description of the process.

It has now been discovered that significantly high yields of 2,4-diamino-6-chloro-s-triazine can be obtained by the reaction of cyanuric chloride and ammonia in a totally aqueous medium, that is, a reaction medium consisting of water, if a very small amount of a wetting agent is added to the reaction medium. The following example illustrates the novel process of this invention:

Into a suitable container was placed 66 ml. of concentrated ammonium hydroxide and 150 ml. of water. There was then added 0.05 ml. of the condensation product of 1 part by weight tall oil and about 2.0 parts by weight of ethylene oxide. With constant agitation, 37 grams of cyanuric chloride were added at a rate such that the temperature did not exceed 50° C. After all the cyanuric chloride was added, the mixture was then heated, with agitation, for a period of about 4 hours while maintaining the temperature between 45°–50° C. The reaction mixture was then cooled to room temperature and the solid 2,4-diamino-6-chloro-s-triazine filtered therefrom and washed with water. The 2,4-diamino-6-chloro-s-triazine was then dried over night at a temperature of 105° C. Twenty-seven and eight-tenths grams, representing a 95% yield based on cyanuric chloride, of substantially pure 2,4-diamino-6-chloro-s-triazine was obtained. The material was a white powder which was insoluble in water or sodium hydroxide and soluble in hydrochloric acid. The material was infusible below 330° C. It contained 25.4% chlorine.

For purposes of further identification, 14.5 grams of the above mentioned product was slurried in 225 ml. of distilled water and 9 ml. of aniline added. The mixture was refluxed for 4 hours and then filtered while hot. The filtrate was cooled, neutralized with a 5% sodium hydroxide solution and the precipitated monophenylmelamine recovered by filtration, washed and dried at 105° C. The monophenylmelamine thus obtained had a melting point of 204°–206° C.

The quantities of reactants and reaction conditions set forth in the preceding example are subject to substantial variation without departing from the scope of the invention. The reaction between cyanuric chloride and ammonia is best carried out at temperatures below 50° C. and preferably between about 40° C. and about 50° C. At higher temperatures tri-substitution takes place, whereas at lower temperatures mono-substitution predominates.

It is preferred that in excess of 4 mols of ammonia be used for each mol of cyanuric chloride. Exceptionally good results are obtained when the reaction is initiated with approximately 5 mols of ammonia for each mol of cyanuric chloride. Higher molar ratios can be used if desired but, depending upon reaction conditions, too large an excess of ammonia results in tri-substitution of the cyanuric chloride, with the resultant drop in yield of 2,4-diamino-6-chloro-s-triazine.

The amount of water used in the reaction medium can also be varied substantially and the exact amount is governed primarily by the physical characteristics of the reaction mixture and the desired ease of handling.

Only minor amounts of the wetting agent are needed to produce the particularly outstanding results of this invention. The concentration of the wetting agent in the reaction mixture can be varied from about 0.01% to about 1.0% by weight of total composition, but higher or lower concentrations can be used if desired. Any of the well known wetting agents can be used in this process. These include soaps, the alkyl aryl sulfonates, of which sodium dodecylbenzenesulfonate is a particular example, sulfated fatty alcohols, alkyl sulfonates, sulfated esters and acids, amide sulfates and sulfonates, sulfated and sulfonated oils, fats, and waxes, fatty esters of glycerol and glycol and other polyhydric products of ethylene oxide with fatty acids, abietic acid, alkyl phenols, such as nonyl phenol, and mercaptans, such as tert.-dodecyl mercaptan, etc., as well as mixtures of these and/or other wetting agents.

What is claimed is:

1. An improved process for the preparation of 2,4-diamino-6-chloro-s-triazine which comprises reacting cyanuric chloride and ammonia in an aqueous medium in the presence of a minor amount of a wetting agent selected from the group consisting of alkyl aryl sulfonates and condensation products of ethylene oxide with abietic acid, tall oil, alkyl phenols and alkyl mercaptans.

2. An improved process for the preparation of 2,4-diamino-6-chloro-s-triazine which comprises reacting cyanuric chloride and ammonia in a reaction medium consisting of water and in the presence of a minor amount of a wetting agent selected from the group consisting of alkyl aryl sulfonates and condensation products of ethylene oxide with abietic acid, tall oil, alkyl phenols and alkyl mercaptans.

3. An improved process for the preparation of 2,4-diamino-6-chloro-s-triazine which comprises reacting 1 mol of cyanuric chloride with at least 4 mols of ammonia in a reaction medium consisting of water and in the presence of a minor amount of a wetting agent selected from the group consisting of alkyl aryl sulfonates and condensation products of ethylene oxide with abietic acid, tall oil, alkyl phenols and alkyl mercaptans.

4. An improved process for the preparation of 2,4-diamino-6-chloro-s-triazine which comprises reacting 1 mol of cyanuric chloride with at least 4 mols of ammonia in a reaction medium consisting of water at a temperature below about 50° C. and in the presence of a minor amount of a wetting agent selected from the group consisting of alkyl aryl sulfonates and condensation products of ethylene oxide with abietic acid, tall oil, alkyl phenols and alkyl mercaptans.

5. An improved process for the preparation of 2,4-diamino-6-chloro-s-triazine which comprises reacting 1 mol of cyanuric chloride with at least 4 mols of ammonia in a reaction medium consisting of water at a temperature in the range of from about 40° C. to about 50° C. and in the presence of a minor amount of a wetting agent selected from the group consisting of alkyl aryl sulfonates and condensation products of ethylene oxide with abietic acid, tall oil, alkyl phenols and alkyl mercaptans.

References Cited in the file of this patent

FOREIGN PATENTS 506,070     Canada _____ Sept. 28, 1954

OTHER REFERENCES

Annales de Chemie et Physique, 3rd series, vol. 19 (1847), pp. 90–91.